United States Patent
Song

[19]

[11] Patent Number: 6,091,464
[45] Date of Patent: Jul. 18, 2000

[54] METHOD FOR MANUFACTURING LIQUID CRYSTAL DISPLAY CAPABLE OF PREVENTING ELECTRICAL SHORTS BETWEEN NEIGHBORING PIXEL ELECTRODES AND THE LIQUID CRYSTAL DISPLAY

[75] Inventor: In-Duk Song, Kyungsangbook-do, Rep. of Korea

[73] Assignee: LG Electronics, Inc., Seoul, Rep. of Korea

[21] Appl. No.: 08/953,484

[22] Filed: Oct. 17, 1997

[30] Foreign Application Priority Data

Oct. 18, 1996 [KR] Rep. of Korea ...................... 96-46749

[51] Int. Cl.[7] ................................................. G02F 1/1343

[52] U.S. Cl. ............................................ 349/38; 349/143

[58] Field of Search .................................... 349/139, 143, 349/142, 38, 39

[56] References Cited

U.S. PATENT DOCUMENTS

| | | |
|---|---|---|
| 5,042,916 | 8/1991 | Ukai et al. . |
| 5,076,666 | 12/1991 | Katayama et al. . |
| 5,159,476 | 10/1992 | Hayashi . |
| 5,276,540 | 1/1994 | Okamoto et al. . |
| 5,305,128 | 4/1994 | Stupp et al. ............................. 257/347 |
| 5,694,185 | 12/1997 | Oh ............................................. 349/64 |
| 5,737,049 | 4/1998 | Shin et al. ............................... 349/122 |

*Primary Examiner*—Kenneth Parker

[57] ABSTRACT

An LCD device and method of forming the same includes a transparent insulation substrate, a plurality of scan lines and data lines perpendicularly crossing each other on the substrate, a metal segment layer overlapping the scan line, a pixel electrode formed at the area surrounded by two neighboring scan lines and two neighboring data lines for contacting with the metal segment, and a switching element electrically connected with the pixel electrode, the scan line and the data line. The pixel electrode or the metal segment layer has at least one projecting portion for allowing contact between the metal segment layer and the pixel electrode through a contact hole.

13 Claims, 6 Drawing Sheets

METHOD FOR MANUFACTURING LIQUID CRYSTAL DISPLAY CAPABLE OF PREVENTING ELECTRICAL SHORTS BETWEEN NEIGHBORING PIXEL ELECTRODES AND THE LIQUID CRYSTAL DISPLAY

BACKGROUND OF THE INVENTION

1. Field of the Invention

The present invention relates to a liquid crystal display (LCD) and a method of manufacturing the same, and more particularly, to an LCD and a method of manufacturing the LCD which is capable of preventing electrical shorts between neighboring pixel electrodes.

2. Description of Background Art

A conventional LCD is driven by an active matrix method which employs thin film transistors (TFTs), signal lines, data lines and others for driving the pixels. Such a conventional LCD is widely used as a display device in audio-video (AV) and official-automation (OA) systems. The conventional LCD has a thinner thickness, a smaller size, a lighter weight, and a lower power consumption than other display devices, such as a cathode-ray-tube (CRT) device. Further, the conventional LCD has a good response speed and display quality for displaying moving video data.

FIG. 1 shows the structure of a conventional active matrix liquid crystal display (AMLCD) device.

As shown in FIG. 1, on a transparent insulation substrate (such as non-alkalic glass), a plurality of scan lines 10 extending in a horizontal direction and a plurality of data lines 20 extending in a vertical direction are formed. A pixel electrode 30 is formed in an area defined by two adjacent scan lines 10 and two adjacent data lines 20. A TFT 40 is electrically connected with the pixel electrode 30, the scan line 10, and the data line 20. The pixel electrode 30 overlaps a portion of the scan line 10. An insulating layer is formed between the pixel electrode 30 and scan line 10. The overlapping portion of the pixel electrode 30 and the overlapped portion of the scan line 10 function as the electrodes of a storage capacitor 70.

FIG. 2 shows a section of a storage capacitor and pixel electrodes in the conventional LCD.

As shown in FIG. 2, a metal segment 50 is formed on a gate insulation layer (not shown) covering the scan line 10. The metal segment 50 covers a portion of the scan line 10, whereas a protection layer (not shown) covers the metal segment 50. The metal segment 50 is electrically connected with the pixel electrode 30 through a storage contact hole 60 which exposes a surface of the metal segment 50. The overlapping portion of the pixel electrode 30, the metal segment 50 and the overlapped portion of the scan line 10 function as the electrodes of the storage capacitor 70.

FIG. 3 shows a cross-sectional view of FIG. 2, taken along line III-III.

As shown in FIG. 3, a scan line 10 made with an aluminum (Al) or chromium (Cr) metal is formed on a transparent insulation substrate 1. A gate insulation layer 11 including silicon oxide or silicon nitride covers the entire surface of the substrate 1. On the gate insulation layer 11, a metal segment 50 having Al or Cr is formed. A protective insulating layer (passivation layer) 17 having silicon nitride covers the metal segment 50. A storage contact hole 60 is formed through the passivation layer 17 for exposing a surface of the metal segment 50. On the passivation layer 17, a pixel electrode 30 having ITO (Indium Tin Oxide) is formed. The pixel electrode 30 is electrically connected with the metal segment 50 through the storage contact hole 60.

In the conventional LCD, however, the neighboring pixel electrodes are positioned to close to each other because each pixel electrode overlaps a substantial portion of the scan line. The overlapping portion of the pixel electrode is positioned too close to the neighboring pixel electrode. When the storage capacitor is not formed or is formed by another method, the distance between the neighboring pixel electrodes is 6 $\mu$m which is greater than the width of the scan line (30 $\mu$m).

Because the neighboring pixel electrodes are positioned so close to each other, when the data signal driven by the TFT is applied to one of the pixel electrodes, the neighboring pixel can be inadvertently driven, causing the pixel electrodes to be shorted out. When the pixel electrode short occurs, the display has point defects and poor color quality.

SUMMARY OF THE INVENTION

Accordingly, the present invention is directed to an LCD and a method of manufacturing the same that substantially obviates one or more of the above and other problems due to limitations and disadvantages of the related art.

An object of the present invention is to overcome the problem of shorts between pixel electrodes in the conventional LCDs.

Another object of the present invention is to provide an LCD with high display quality and a method of manufacturing the same.

According to the embodiments of the present invention, an LCD includes a transparent insulation substrate, a plurality of scan lines and data lines formed on the substrate and perpendicularly crossing each other, an insulation layer covering the scan lines, a metal segment formed on the insulation layer overlapping a part of one of the scan lines, a pixel electrode electrically connected with the metal segment and formed in an area surrounded by two neighboring scan lines and two neighboring data lines, and a TFT electrically connected with the pixel electrode, the scan line and the data line.

A method of manufacturing an LCD according to the embodiments of the present invention includes the steps of forming a scan line on a transparent insulation substrate, forming an insulation layer on the scan line, forming a metal segment overlapping with a part of the scan line, forming a passivation layer, forming a contact hole in the passivation layer for exposing a surface of the metal segment, and forming a pixel electrode for contacting with the metal segment through the contact hole.

In one embodiment, each pixel electrode includes at least one expanded portion projecting toward the corresponding metal segment so as to allow the pixel electrode to contact the corresponding metal segment through a contact hole. In another embodiment, each metal segment includes at least one expanded portion projecting toward the corresponding pixel electrode so as to allow the pixel electrode to contact the metal segment through a contact hole.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE ATTACHED DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Reference will now be made in detail to the preferred embodiments of the present invention, examples of which are illustrated in the accompanying drawings.

Figure 4A:
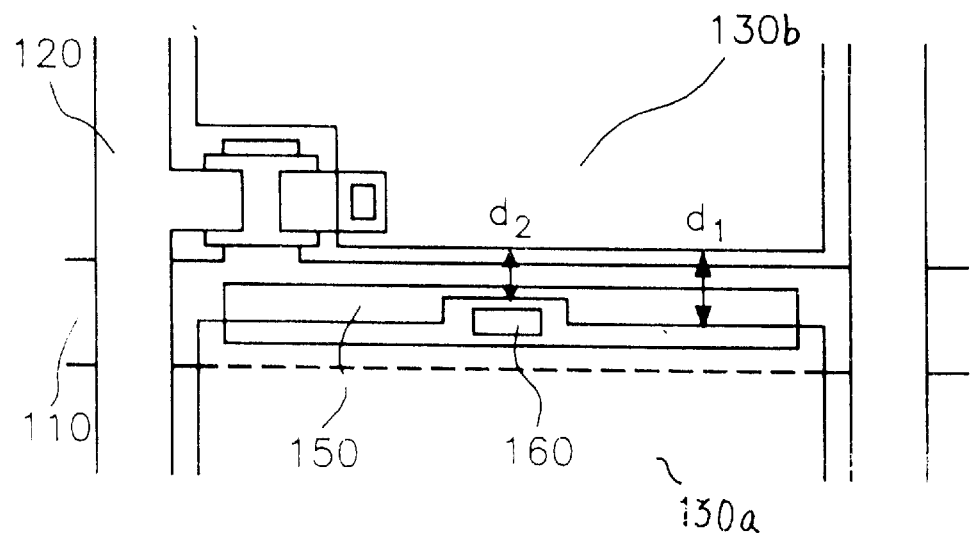
FIGS. 4a and 4b are plan views of an LCD according to a first embodiment of the present invention.
Figure 4B:
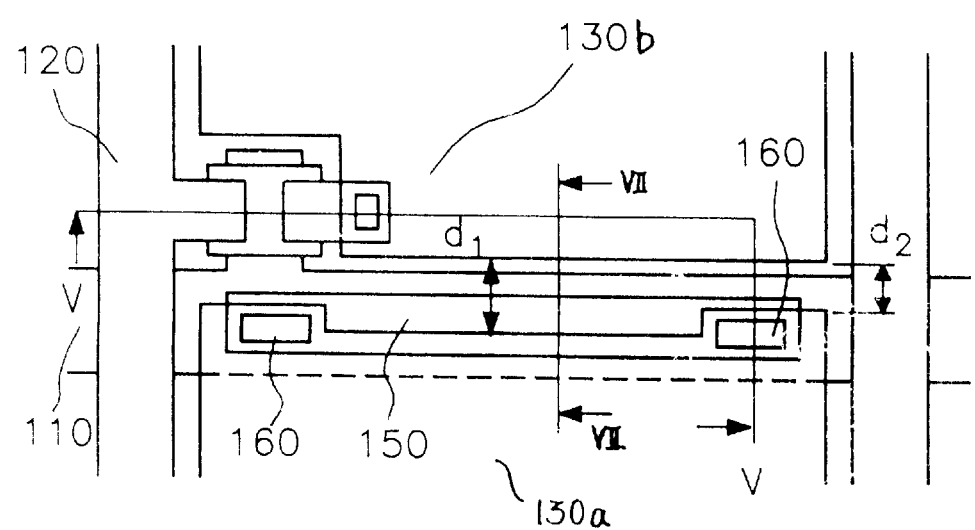

FIGS. 4a and 4b show examples of an LCD according to the first embodiment of the invention. Referring to FIGS. 4a and 4b, the LCD according to the present invention includes a plurality of scan lines 110, a plurality of data lines 120 crossing the scan lines 110 perpendicularly, a plurality of TFTs positioned at the crossover portions, and a plurality of pixel electrodes 130a, 130b formed on each side of the scan line 110.

On the scan line 110, a metal segment 150 is formed. The pixel electrode 130a is formed to partially cover the scan line 110 and the metal segment 150. The pixel electrode 130a is electrically connected with the metal segment 150 through a storage contact hole 160. The metal segment 150 formed on the middle area of the scan line 110 is preferably for maintaining the aperture ratio of the LCD.

As shown in FIG. 4a, the pixel electrode 130a includes an expanded portion projecting toward the neighboring pixel electrode 130b. The expanded portion of the pixel electrode 130a completely covers the area of the metal segment 150 having the storage contact hole. The expanded portion of the pixel electrode 130a contacts the metal segment 150 through the storage contact hole 160.

The distance (d2) between the pixel electrode 130b and the expanded portion of the pixel electrode 130a is 12 μm, whereas the distance (d1) between the pixel electrode 130b and the non-projecting part of the pixel electrode 130a is 20 μm. Only a portion of the pixel electrode 130a is positioned near the pixel electrode 130b. As a result, this structure prevents shorts between the neighboring pixel electrodes 130a and 130b.

In another example, as shown in FIG. 4b, the pixel electrode 130a includes two expanded portions both projecting toward the adjacent pixel electrode 130b. The two expanded portions of the pixel electrode 130a correspondingly fill two storage contact holes 160. Having two contact holes 160 ensures stable contact between the pixel electrode 130a and metal segment 150.

FIGS. 5a–5f show cross-sectional views taken along line V—V in FIG. 4b for explaining a method of manufacturing an LCD according to the embodiments of the present invention.

Figure 5A:
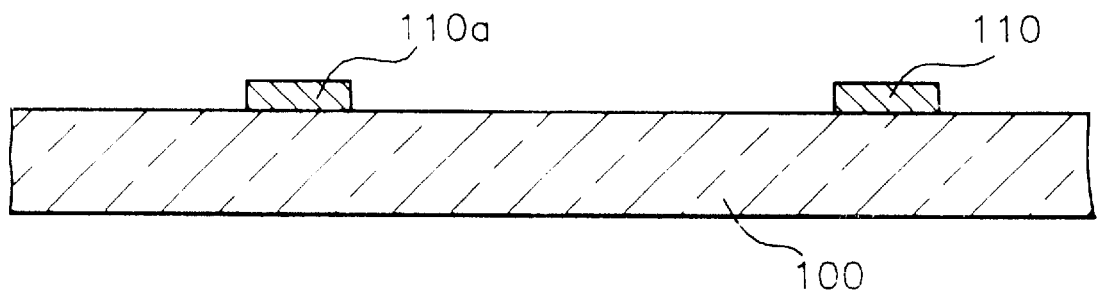
FIGS. 5a–5f show cross-sectional views, taken along line V—V in FIG. 4b, for explaining a manufacturing process for forming an LCD according to the first embodiment of the present invention.

As shown in FIG. 5a, a metal such as aluminum (Al) or chromium (Cr) is deposited on a transparent insulation substrate 100. A scan line 110 and a gate electrode 110a are formed by patterning the deposited metal.

Figure 5B:
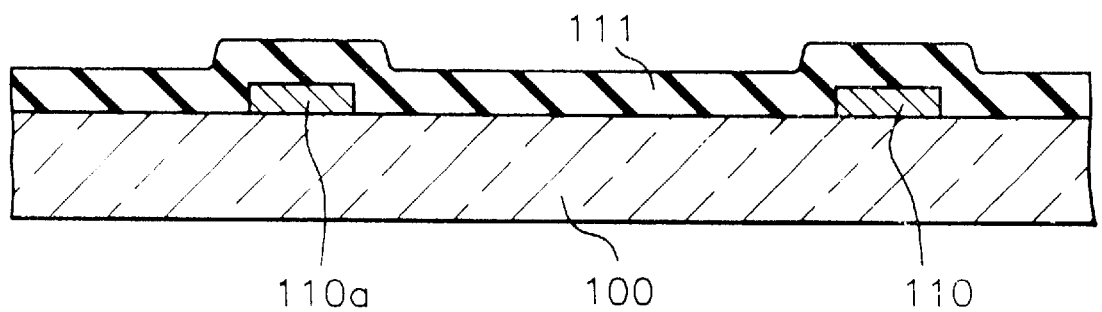

As shown in FIG. 5b, on the substrate 100 having the scan line 110 and the gate electrode 110a, a gate insulation layer 111 is formed by depositing silicon nitride using PECVD (Plasma Enhanced Chemical Vapor Deposition).

Figure 5C:
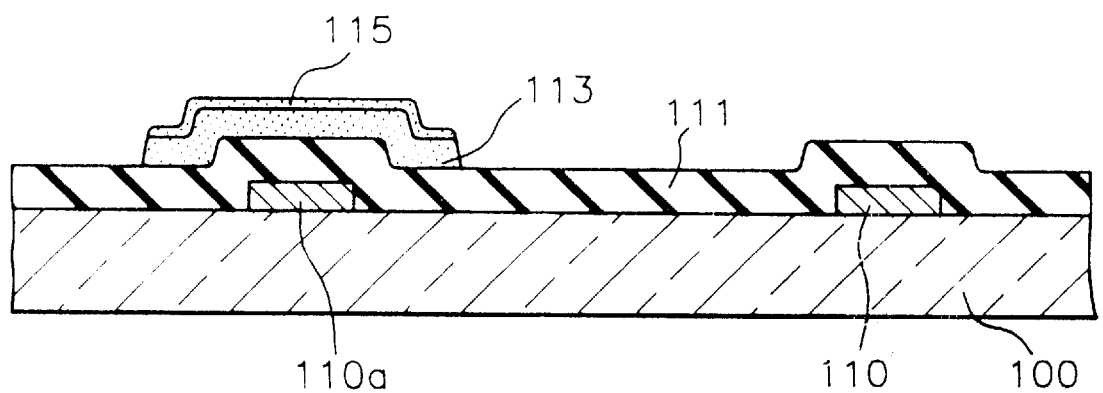

As shown in FIG. 5c, on the gate insulation layer 111, a semiconductor layer 113 having amorphous silicon and an impurity doped semiconductor layer 115 having P-type impurity doped amorphous silicon are sequentially deposited using PECVD. The semiconductor layer 113 and the impurity doped semiconductor layer 115 are then patterned into an island by using photolithography.

Figure 5D:
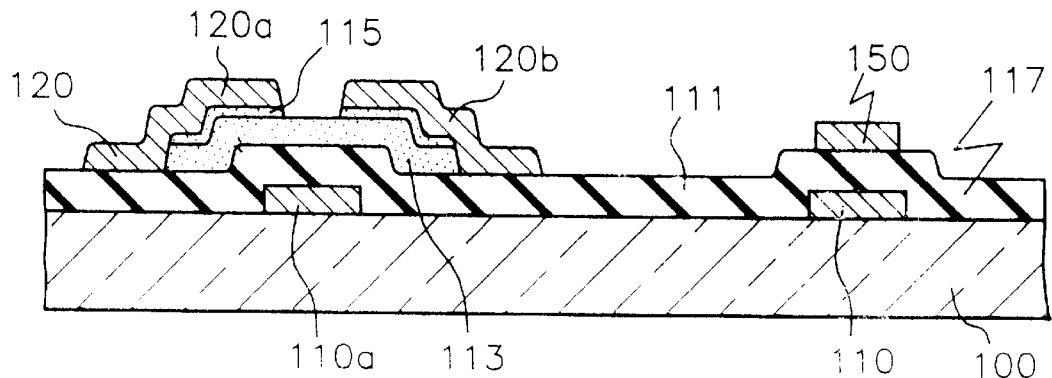

As shown 111 FIG. 5d, on the entire surface of the substrate 100, a metal such as aluminum (Al) or chromium (Cr) is deposited using a sputtering method. A data line 120 having a source electrode 120a, a drain electrode 120b separated from the source electrode 120a, and a metal segment 150 are formed. A portion of the data line 120 is selectively removed, and a portion of the impurity doped semiconductor layer 115 is selectively removed by dry etching to expose a surface of the semiconductor layer 113.

Figure 5E:
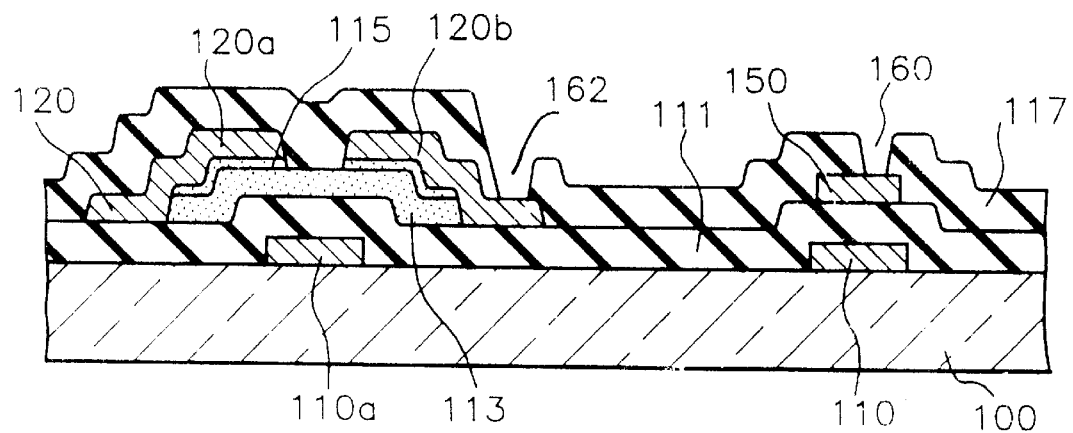

As shown in FIG. 5e, on the entire surface of the substrate 100, a passivation layer 117 composed of silicon oxide or silicon nitride is deposited. A drain contact hole 162 for exposing the drain electrode 120b and a storage contact hole 160 for exposing the metal segment 150 are formed by patterning and etching the passivation layer 117.

Figure 5F:
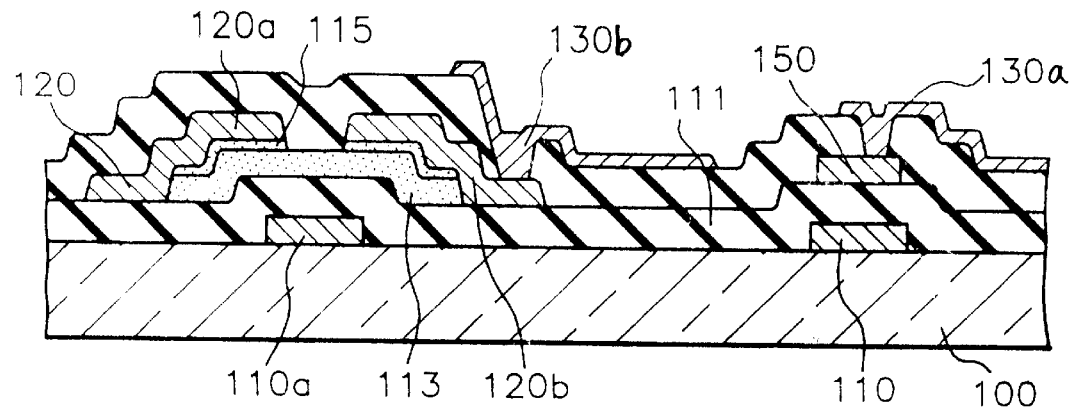

As shown in FIG. 5f, on the passivation layer 117, a transparent conductive material having ITO(Indium Tin Oxide) is deposited using PECVD. A pixel electrode 130a i's formed by selectively etching the transparent conductive material. In one embodiment, the pixel electrode 130a includes an extended portion projecting toward the neighboring pixel electrode 130b for contacting with the metal segment 150 through the storage contact hole 160. The extended portion of the pixel electrode 130a is electrically connected with the metal segment 150 through the storage contact hole 160.

Figure 6A:
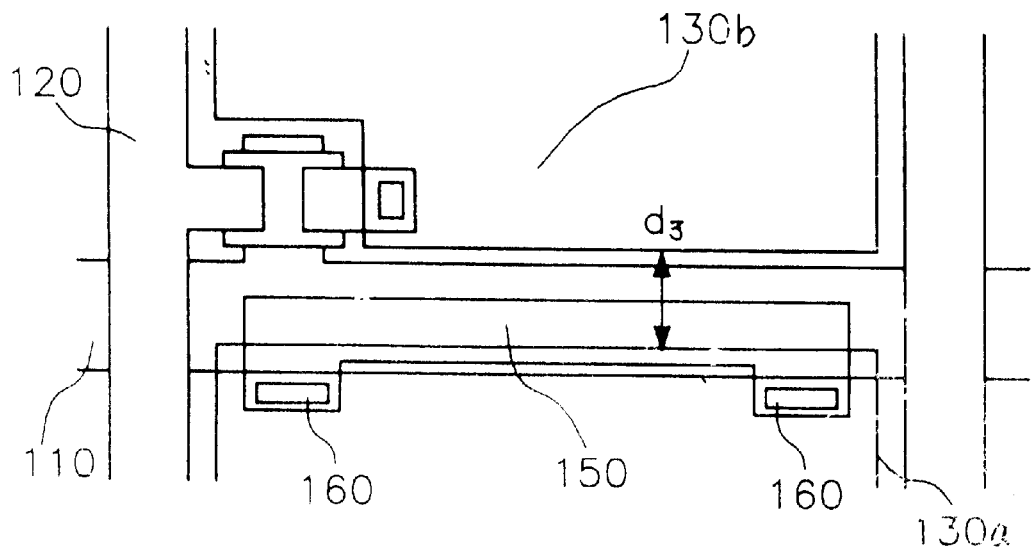
FIGS. 6a and 6b are plan views of an LCD according to a second embodiment of the present invention.
Figure 6B:
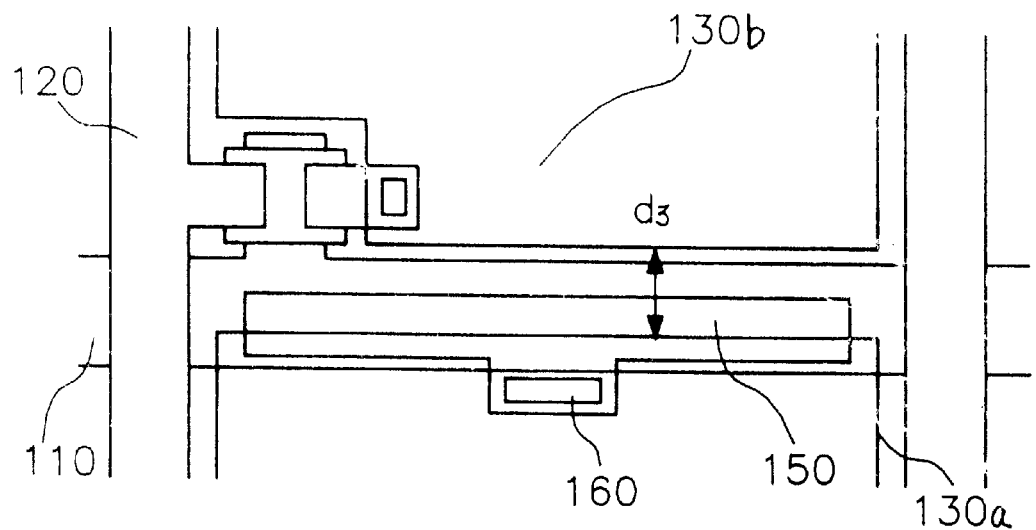

FIGS. 6a and 6b show examples of an LCD according to the second embodiment of the invention. In the second embodiment, instead of the pixel electrode, the metal segment of the LCD has at least one expanded portion projecting toward the corresponding pixel electrode.

As shown in FIGS. 6a and 6b, the metal segment 150 is formed on the scan line 110, and the pixel electrode 130a partially covers the metal segment 150 and the scan line 110. The metal segment 150 includes at least one expanded portion projecting toward the pixel electrode 130a for contacting with the pixel electrode 130a. Through the storage contact hole 160, the pixel electrode 130a is connected with the metal segment 150. The extended portion of the metal segment 150 allows a greater distance (d3) between the pixel electrode 130a and the neighboring pixel electrode 130b than in the conventional LCD. As a result, electrical shorts between the pixel electrodes 130a and 130b are prevented.

The method of manufacturing the LCD according to the second embodiment of the invention is substantially the same as the method described in connection with FIGS. 5a–5f according to the first embodiment of the invention, except that in the second embodiment it is the metal segment 150, and not the pixel electrode 130a, which has the expanded portion(s).

According to the embodiments of the present invention, the pixel electrode or the metal segment has a projection part allowing contact between the pixel electrode and the metal segment. Generally, the distance between the pixel electrodes is increased compared to that in the conventional LCD. At the same time, the electrical contacts between the pixel electrode and the metal segment are improved.

Figure 7:
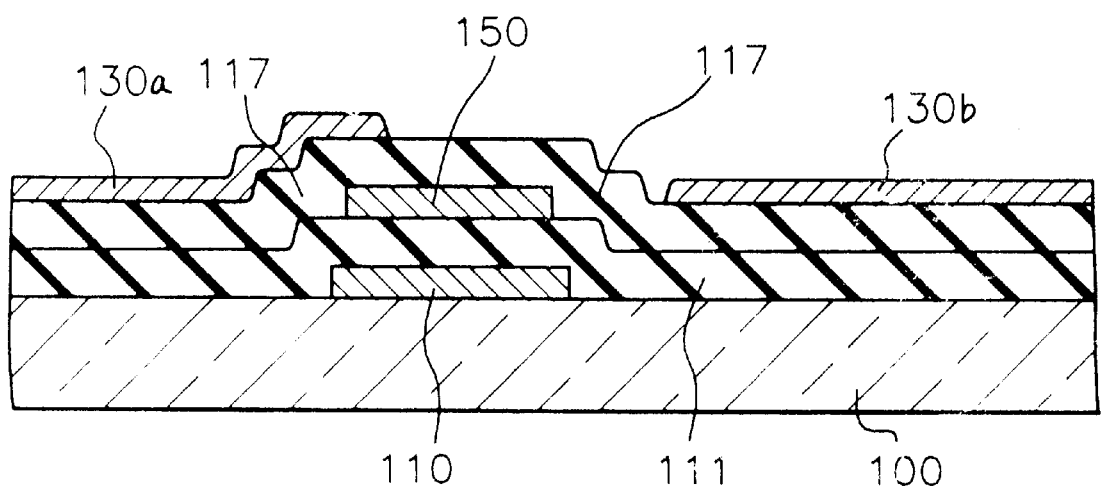
FIG. 7 shows a cross-sectional view of an LCD, taken alone line VII—VII in FIG. 4b, according to the embodiments of the present invention.

FIG. 7 shows a cross-sectional view of the LCD, taken alone line VII—VII in FIG. 4b, for effectively demonstrating the increased distance between neighboring pixel electrodes.

Figure 1:
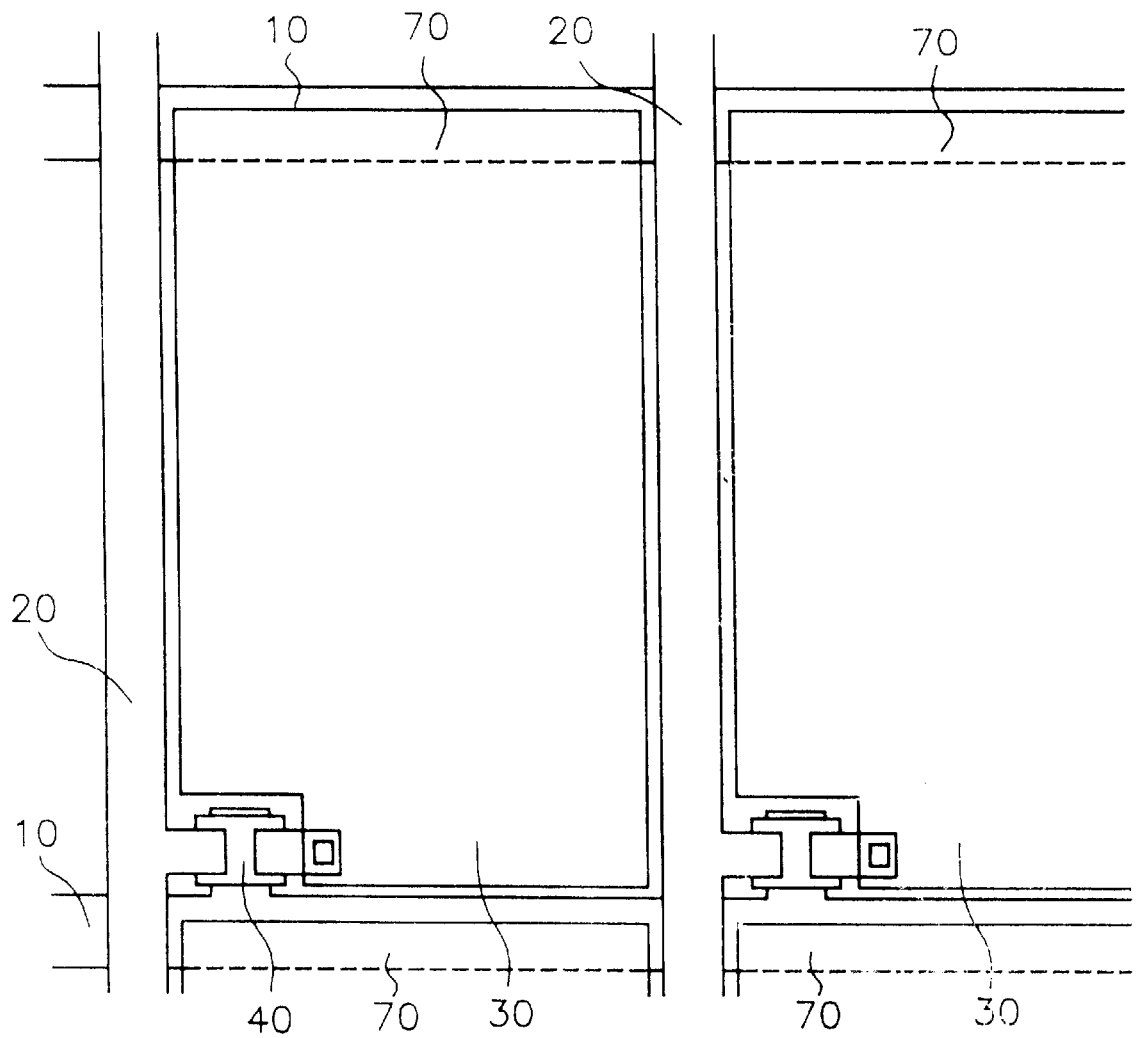
FIG. 1 is a plan view of a conventional LCD.
Figure 2:
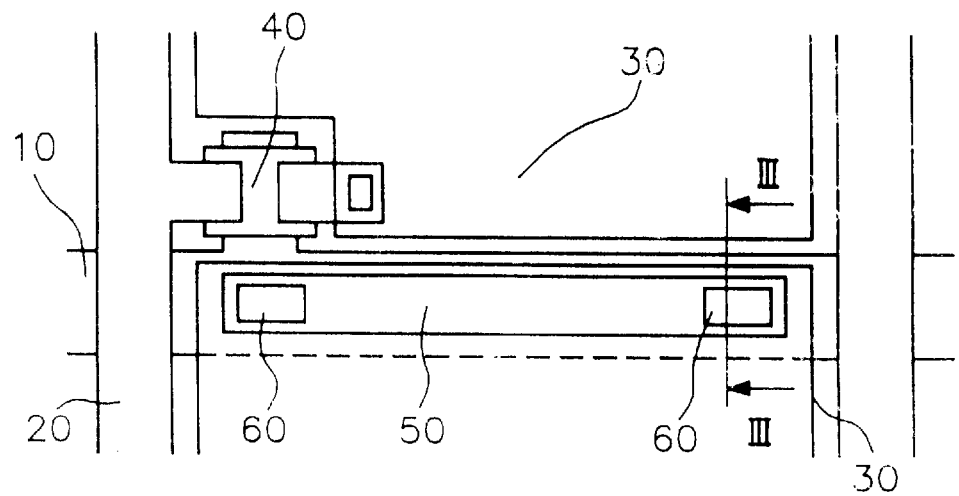
FIG. 2 is a detailed plan view of a storage capacitor of the conventional LCD.
Figure 3:
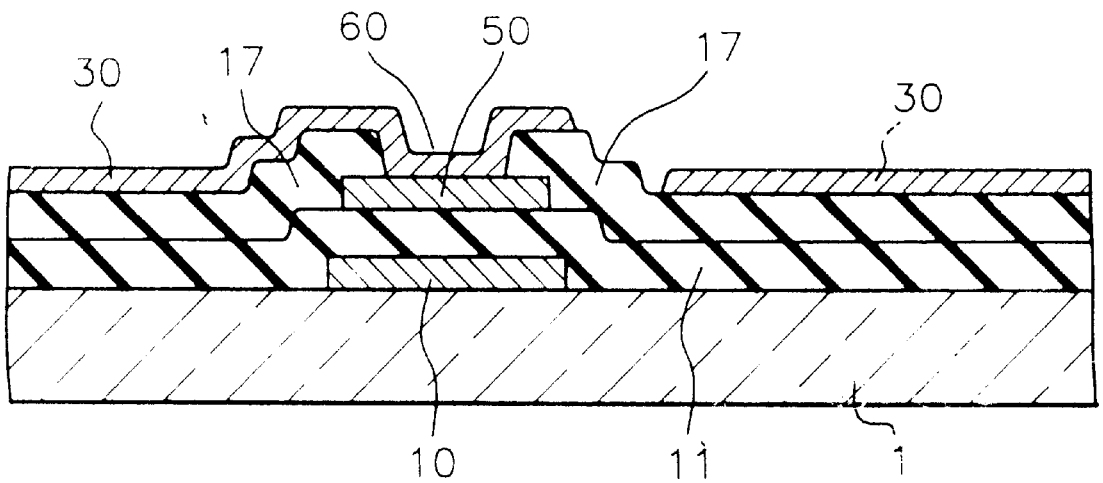
FIG. 3 is a cross-sectional view of the conventional LCD, taken along line III–III in FIG. 2.

As shown in FIG. 7, the pixel electrode 130a and 130b are spaced farther apart from each other than the pixels 30 of the conventional LCD as shown in FIG. 3. Therefore, according to the present invention no electrical shorts occur between neighboring pixel electrodes.

The present invention offers advantages including the following.

When the storage electrode is formed by overlapping the pixel electrode over the scan line, a metal segment is formed between the pixel electrode and scan line at the overlapping area. The metal segment or pixel electrode has an expanded portion for contacting the metal segment through a contact hole, so that it becomes unnecessary for the pixel electrode to substantially cover the metal segment. Therefore, the distance between the neighboring pixel electrodes is increased compared to the conventional LCD. This prevents occurrence of shorts between the neighboring pixel electrodes, and achieves good display quality without any point defects.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of forming a liquid crystal display, comprising:
   forming at least first and second scan lines on a substrate, the first scan line having a first projecting portion, which projects towards the second scan line;
   forming an insulation layer over the substrate;
   forming a transistor such that the first projecting portion forms part of the transistor;
   forming a metal segment layer over a portion of the second scan line, the metal segment layer having at least one second projecting portion projecting towards the first scan line; and
   forming a pixel electrode between the first and second scan lines such that a first end of the pixel electrode is connected to the transistor and a second end of the pixel electrode, opposite the first end, is disposed over and contacts the second projecting portion.

2. The method of claim 1, wherein the forming a transistor step comprises:
   forming a semiconductor layer on the insulation layer over the first projecting portion;
   forming an impurity-doped semiconductor layer on the semiconductor layer; and
   forming a data line and a drain electrode, the data line having a source electrode projecting therefrom, and the source and drain electrodes being formed on the impurity-doped semiconductor layer.

3. The method of claim 2, further comprising:
   forming a passivation layer over the substrate;
   forming a drain contact hole and at least one metal segment contact hole in the passivation layer for exposing a surface of the drain electrode and a surface of the second projecting portion, respectively; and wherein
   the step of forming the pixel electrode forms a portion of the first end of the pixel electrode in the drain contact hole and forms a portion of the second end of the pixel electrode in the metal segment layer contact hole.

4. The method of claim 2, wherein the step of forming the metal segment layer is performed concurrently with the step of forming the data line and the drain electrode.

5. The method of claim 1, wherein the forming a metal segment layer step forms two second projecting portions.

6. The method of claim 1, wherein the forming a pixel electrode step forms the pixel electrode such that the second end of the pixel electrode extends over a portion of the second scan line.

7. A liquid crystal display device, comprising:
   at least first and second scan lines formed on a substrate, the first scan line having a first projecting portion, which projects towards the second scan line;
   an insulation layer formed over the substrate;
   a transistor formed on the substrate such that the first projecting portion forms part of the transistor;
   a metal segment layer formed over a portion of the second scan line; and
   a pixel electrode formed between the first and second scan lines, a first end of the pixel electrode being connected to the transistor and a second end of the pixel electrode, opposite the first end, including at least one second projecting portion projecting over and in contact with the metal segment layer, the second projecting portion having a width less than a width of the pixel electrode, wherein the pixel electrode includes two second projecting portions.

8. A liquid crystal display device, comprising:
   at least first and second scan lines formed on a substrate, the first scan line having a first projecting portion, which projects towards the second scan line;
   an insulation layer formed over the substrate;
   a transistor formed on the substrate such that the first projecting portion forms part of the transistor;
   a metal segment layer formed over a portion of the second scan line and including at least one second projecting portion projecting towards the first scan line; and
   a pixel electrode formed between the first and second scan lines, a first end of the pixel electrode being connected to the transistor and a second end of the pixel electrode, opposite the first end, being disposed over and connected to the second projecting portion.

9. The device of claim 8, wherein the transistor comprises:
   a semiconductor layer formed on the insulation layer over the first projecting portion;
   an impurity-doped semiconductor layer formed on the semiconductor layer;
   a data line formed over the substrate and having a source electrode projecting therefrom, the source electrode being formed on a portion of the impurity-doped semiconductor layer; and
   a drain electrode formed on another portion of the impurity-doped semiconductor layer.

10. The device of claim 9, further comprising:

a passivation layer formed over the substrate and defining a drain contact hole and at least one metal segment contact hole for exposing a surface of the drain electrode and a surface of the second projecting portion, respectively; and wherein the first end of the pixel electrode contacts the drain electrode via the drain contact hole; and the second end of the pixel electrode contacts the second projecting portion via the metal segment layer contact hole.

11. The device of claim 8, wherein the metal segment layer includes two second projecting portions.

12. The device of claim 8, wherein the second end of the pixel electrode extends over a portion of the second scan line.

13. A method of forming a liquid crystal display, comprising:

forming at least first and second scan lines on a substrate, the first scan line having a first projecting portion, which projects towards the second scan line;

forming an insulation layer over the substrate;

forming a transistor such that the projecting portion forms part of the transistor;

forming a metal segment layer over a portion of the second scan line; and forming a pixel electrode between the first and second scan lines such that a first end of the pixel electrode is connected to the transistor and a second end of the pixel electrode, opposite the first end, includes two second projecting portions projecting over and in contact with the metal segment layer, the second projecting portions having a width less than a width of the pixel electrode.

* * * * *